Patented May 29, 1951

2,555,062

UNITED STATES PATENT OFFICE 2,555,062

VINYL CHLORIDE POLYMERS PLASTICIZED WITH POLYESTERS

Kathleen W. Small and Percy A. Small, Welwyn, England, assignors to Imperial Chemical Industries Limited, a corporation of Great Britain No Drawing. Application March 24, 1948, Serial No. 16,890

7 Claims. (Cl. 260—31.6)

This invention relates to improvements in and relating to compositions comprising polymers and interpolymers of vinyl chloride and one or more plasticizers therefor.

A large number of plasticisers for vinyl chloride polymers and interpolymers is known, many of which are esters such as, for example, tricresyl phosphate, triphenyl phosphate, dibutyl phthalate, dibutyl sebacate and dioctyl phthalate. A disadvantage encountered with many of the known plasticisers is that they are appreciably volatile even at room temperature, with the result that loss of plasticiser from compositions in which they are incorporated over a period of time can be quite considerable and may result in serious deterioration in the properties of the composition. Also, some plasticisers tend to migrate through compositions in which they are incorporated and into any adjacent material.

An object of the present invention is to provide new and improved plasticised compositions comprising polymers and interpolymers of vinyl chloride. A further object is to provide plasticised compositions comprising polymers and interpolymers of vinyl chloride in which the plasticisers are non-volatile and non-migrating. Other objects will appear hereinafter.

According to the present invention, these objects are accomplished by means of a composition comprising—(a) a polymeric material obtained by polymerising vinyl chloride alone or by interpolymerising vinyl chloride with not more than 25% of its weight of another ethylenically unsaturated compound, and (b) not more than 150% by weight of said polymeric material of a plasticiser comprising one or more polyesters having a viscosity at 109° C. of at least 15 poises and derived from aliphatic glycols containing at least two carbon atoms per molecule and organic dicarboxylic acids, at least 50% by weight of both the glycols and the acids consisting of compounds having straight-chain molecules with their functional groups attached one at each end of the chain, and at least 90% by weight of the acids being aliphatic in character, the ratio of the total number of carbon atoms to the number of carboxyl groups in the polyester molecules being at least 4.5 to 1, up to 10% of the methylene groups forming the chains connecting the ester groups of the polyester molecules being replaced by oxygen atoms if desired and/or up to 5% of said methylene groups being replaced by sulphur atoms, if desired.

Polymeric materials which are suitable for the preparation of compositions according to the present invention include, for example, interpolymers of vinyl chloride with ethylene, vinyl esters such as vinyl acetate, vinylidene chloride, styrene, acrylic compounds, such as methyl methacrylate, methyl-chloracrylate and acrylonitrile, and esters or anhydrides of ethylene 1.2 dicarboxylic acids such as fumaric acid esters and maleic anhydride.

Suitable straight-chain aliphatic glycols having their hydroxyl groups attached one at each end of the chain which may be used to prepare polyesters for use as plasticisers in the compositions of this invention include, for example, ethylene, trimethylene, tetramethylene, pentamethylene and hexamethylene glycols. Suitable straight-chain aliphatic dicarboxylic acids having their carboxylic groups attached one at each end of the chain include, for example, glutaric, adipic and sebacic acids. Polyesters derived from such glycols and acids and which have a ratio of total number of carbon atoms to carboxyl groups of at least 4.5 to 1 are compatible with polymers and interpolymers of vinyl chloride and exert an excellent plasticising action upon them. Polyesters in which the said ratio is less than 4.5:1 are not compatible with vinyl chloride polymers and interpolymers. As examples illustrating this rule, we may consider polytrimethylene glutarate, in which the ratio is 4:1, and polypentamethylene glutarate, in which the ratio is 5:1. Of these polyesters, the latter is compatible with vinyl chloride polymers and interpolymers whilst the former is not.

It is preferred to use polyesters melting below about 35° C. although the use of those melting at higher temperatures is not excluded. The polyesters melting at high temperatures, and particularly those of low melt viscosity, frequently suffer from the disadvantage that after a period of time they tend to form a bloom on the surface of compositions in which they have been incorporated and a slight decrease in the low-temperature flexibility of the composition is observed. Polyesters of low melting point may be obtained by reacting together mixtures of glycols and dicarboxylic acids and in order to achieve this object up to 50% by weight of both the glycols and acids which are employed may be compounds having branched-chain structures and/or having functional groups not attached to terminal carbon atoms.

Suitable aliphatic glycols having branched-chain molecules and/or having hydroxyl groups not attached to terminal carbon atoms include, for example, 1.2 propylene glycol, 1.3 butylene glycol and 1.3 isobutylene glycol. Suitable dicarboxylic acids having branched chain molecules and/or having carboxyl groups not attached to terminal carbon atoms include, for example, 1.2 propane dicarboxylic acid, 1.3 butane dicarboxylic acid, methyl adipic acid and 1.3 isobutane dicarboxylic acid. Polyesters of low melting point and suitable for use in the compositions of the present invention may also be prepared by reacting mixtures of glycols and dicarboxylic acids in which up to 10% by weight of the acids are aromatic in character. Suitable aromatic dicarboxylic acids which may be employed include phthalic and hexahydrophthalic acids. Another method of obtaining polyesters having low melting points is to use reaction mixtures containing a proportion of glycols and/or dibasic acids which have one or more oxygen or sulphur atoms in the chain separating the functional groups. The proportion of such compounds included in the mixture should not exceed that which yields a polyester having oxygen atoms replacing up to 10% and/or sulphur atoms replacing up to 5% of the methylene groups connecting the ester groups of the polyester molecules. Examples of such compounds which may be employed include diethylene glycol, triethylene glycol, Cellosolve, diglycollic acid, thiodiglycol and thiodiglycollic acid. It is preferred not to use more than the stated maximum proportions of each of the above classes of compounds which may be included as reactants in order to obtain a polyester of low melting point, since otherwise the excellent plasticising action observed with polyesters derived entirely from straight-chain aliphatic glycols and dicarboxylic acids having their functional groups attached one at each end of the chain is not preserved.

We do not use a proportion of plasticiser in excess of 150% by weight of the polymeric material since the use of larger proportions of plasticiser achieves no practical advantages but leads to an increase in the cost of the composition.

For best results it is desirable to use polyesters having as high a viscosity as possible while still permitting easy handling of the material. The viscosity of the polyesters is a measure of their molecular weights and a relationship between viscosity at 109° C. and molecular weight for a series of five linear polyesters derived from straight-chain aliphatic glycols and straight-chain aliphatic dibasic acids has been described in the Journal of the American Chemical Society for 1940, volume 62, page 1057. It is preferred to use polyesters having a viscosity at 109° C. within the range of 20 to 800 poises.

As indicated above, polyesters having viscosities at 109° C. down to 15 poises may be used but as lower viscosities are approached the polyesters become less readily compatible with the polymeric material and they become appreciably volatile. Thus in the cases of polytrimethylene adipate and polyethylene sebacate, for example, it is desirable to use materials having a viscosity at 109° C. of at least 15 poises in order to obtain good compatibility with the polymeric material over the range of proportions hereinbefore set forth, i. e. up to 150% by weight of the polymeric material. It has been found that the minimum value of the melt viscosity of individual polyesters at which the polyesters are permanently compatible with polymers and interpolymers of vinyl chloride, i. e. do not form a bloom on the surface of the plasticised polymers over a period of time, increases with increase in the melting point of the polyester and also increases as the minimum carbon atom/carboxyl group ratio is approached.

The maximum viscosity at 109° C. which can be achieved without resort to the use of a molecular still in the preparation of the polyesters is about 800 poises and polyesters having higher viscosities are more difficult to handle. In addition, the softening power of the polyesters decreases at very high molecular weights, i. e. at very high viscosities, necessitating the use of larger proportions of polyester in the composition.

In addition to the polyesters, other ingredients such as stabilisers, fillers, pigments, and other plasticisers may be incorporated in the compositions of this invention.

The plasticiser may be mixed with the polymeric material in any convenient known manner, for example, by milling on hot rolls or in a Banbury mixer.

In addition to the advantages already described, the compositions of this invention have excellent oil- and water-resistance and low-temperature flexibility. They are odourless and do not impart taste to materials with which they come into contact. They also have good mechanical properties and may be used for a wide variety of applications. Thus they may be used to produce films, for example, in the manufacture of raincoats, umbrellas, and curtains, and for sheathing high-frequency electric cables, for example, for use in television or "Radar" equipment.

The invention is illustrated but in no way limited by the following examples, in which all parts are by weight.

*Example I*

Polypentamethylene glutarate having a melt viscosity of 66 poises at 109° C. was obtained by heating 1320 parts glutaric acid with 1150 parts of pentamethylene glycol and 3 parts of p-toluene sulphonyl chloride until evolution of water ceased. The temperature was gradually raised to 250° C. and the pressure reduced to 0.1 m.m. Hg for 48 hours. The resultant polyester softened to a highly viscous liquid about 30° C. and had acid value of 0.4 mgm. KOH/gm.

80 parts of this polyester and 100 parts of the polymer of vinyl chloride known as "Corvic" (registered trade-mark) were mixed on hot rolls at 160° C., together with 2 parts of calcium stearate as stabiliser.

The product was moulded into a sheet which had a tensile strength of 1,900 p. s. i., 290% elongation at break, cold bend at −30° C., and cold impact at −25° C.

*Example II*

Polypentamethylene sebacate having a melt viscosity of 130 poises at 109° C. was obtained by heating 2020 parts of sebacic acid with 1150 parts of pentamethylene glycol and 3 parts of p-toluene sulphonyl chloride until evolution of water ceased. The temperature was then gradually raised to 250° C., and the pressure reduced to 0.1 mm., for 48 hours. The resultant polyester was a solid having an acid value of less than 1 mgm. potassium hydroxide/gm.

80 parts of this polyester and 100 parts of the polymer of vinyl chloride known as "Corvic" (registered trade-mark) were mixed on hot rolls at 160° C., together with 2 parts of calcium stearate as stabiliser.

The product was moulded into a sheet which had a tensile strength of 1,900 p. s. i., 30% elongation at break, cold bend at −45°/−50° C., and cold impact at −33° C.

*Example III*

A sheet was prepared as in Example I substituting a polypentamethylene adipate having a melt viscosity of 32 poises at 109° C. for the polypentamethylene glutarate.

This sheet had a tensile strength of 1,700 p. s. i., 310% elongation at break, cold impact at −25° C., and hot penetration of 21.5%.

*Example IV*

A sheet was prepared as in Example I using a polytetramethylene adipate having melt viscosity of 680 poises at 109° C. in place of the polypentamethylene glutarate.

This sheet had a tensile strength of 2,100 p. s. i., 180% elongation at break, cold bend at −15/−20° C.

*Example V*

A copolymeric ester was prepared from pentamethylene glycol and a mixture (50:50 mole) adipic and sebacic acids by the general method described in Example I. The resultant polyester had a melt viscosity of 94 poises at 109° C. and acid value less than 1 mgm. KOH/gm.

A composition was compounded and molded as in Example I but substituting this mixed polyester for the polypentamethylene glutarate.

The resultant sheet had a tensile strength of 1,900 p. s. i., 310% elongation at break, cold impact at −28° C., cold bend at between −35 and −40° C.

*Example VI*

A polyhexamethylene glutarate adipate was prepared using equivalent amounts of glutaric and adipic acids, by the method described in Example I. The product had a melt viscosity of 450 poises at 109° C. and acid value of less than 1 mgm. KOH/gm.

A composition was compounded and moulded as in Example I, replacing the polypentamethylene glutarate by this mixed polyester. A sheet moulded as described in Example I had a tensile strength of 1,900 p. s. i., 250% elongation at break and cold bend at between −30 and −35° C.

*Example VII*

A polyester was prepared from 730 parts adipic acid, 360 parts tetramethylene glycol and 76 parts 1:2-propylene glycol by the method described in Example I. The product had a melt viscosity of 86 poises at 109° C.

A compensation compounded and moulded as in Example I, but substituting this mixed polyester for the polypentamethylene glutarate, had a tensile strength of 1,900 p. s. i., 175% elongation at break and hot penetration of 15%.

*Example VIII*

A polyester having a melt viscosity of 170 poises at 109° C., was prepared from a mixture containing sebacic acid, pentamethylene glycol and diethylene glycol in the molecular proportions of 2:1:1 respectively.

A composition was compounded and moulded as in Example I but substituting this mixed polyester for the polypentamethylene glutarate. The resulting sheet had a tensile strength of 1,900 p. s. i., 300% elongation at break, cold impact at −27° C. and hot penetration of 20%.

*Example IX*

A polyester having a melt viscosity of 37 poises at 109° C. was prepared by the method described in Example I using 132 parts adipic acid, 14 parts phthalic acid and 90 parts tetramethylene glycol.

Films, .005″ in thickness, prepared from compositions containing 65% polyvinyl chloride and 35% of this polyester were of excellent clarity, good flexibility and did not exhibit a bloom on keeping.

We claim:

1. A plasticized composition comprising a polymeric material selected from the group consisting of polymers of vinyl chloride and interpolymers of vinyl chloride with up to 25% of its weight of another ethylenically unsaturated compound and up to 150% by weight of said polymeric material of a plasticizer comprising a polyester having a viscosity at 109° C. of at least 15 poises and derived from aliphatic glycols containing at least two carbon atoms per molecule and organic dicarboxylic acids, at least 50% by weight of said glycols and said acids consisting of compounds having straight chain molecules and their functional groups attached at the ends of the chain and at least 90% by weight of said acids being aliphatic, the ratio of the total number of carbon atoms to carboxyl groups in the polyester molecules being at least 4.5 to 1.

2. A composition as claimed in claim 1 wherein up to 10% of the methylene groups forming the chains connecting the ester groups of the polyester molecules are replaced by oxygen atoms.

3. A composition as claimed in claim 2 wherein up to 5% of the methylene groups forming the chains connecting the ester groups of the polyester molecules are also replaced by sulfur atoms.

4. A composition as claimed in claim 1 wherein up to 5% of the methylene groups forming the chains connecting the ester groups of the polyester molecules are replaced by sulfur atoms.

5. A composition as claimed in claim 1 wherein the polyesters have a viscosity at 109° C. of between 20 and 800 poises.

6. A composition as claimed in claim 1 wherein the polyesters have a melting point of less than 35° C.

7. A composition as claimed in claim 1 wherein the plasticizer comprises a polyester obtained from pentamethylene glycol and glutaric acid.

KATHLEEN W. SMALL.
PERCY A. SMALL.

REFERENCES CITED

The following references are of record in the file of this patent:

UNITED STATES PATENTS

| Number | Name | Date |
|---|---|---|
| 2,036,009 | Wright | Mar. 31, 1936 |
| 2,071,250 | Carothers | Feb. 16, 1937 |
| 2,073,031 | Sly | Mar. 9, 1937 |
| 2,339,387 | Endres | Jan. 18, 1944 |

FOREIGN PATENTS

| Number | Country | Date |
|---|---|---|
| 586,826 | Great Britain | Apr. 1, 1947 |